Apr. 24, 1923.
J. G. NEWMAN
MATCH
Filed Nov. 2, 1921   3 Sheets-Sheet 1
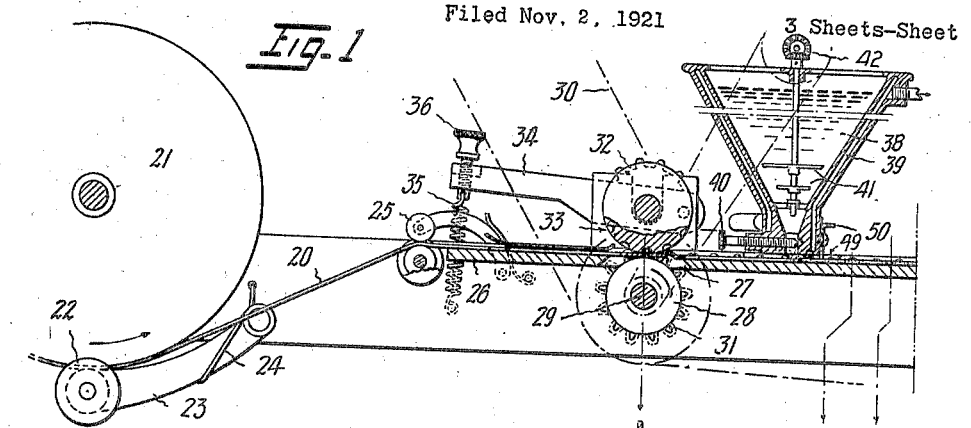
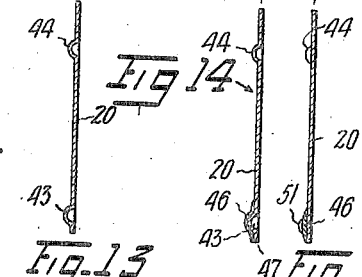
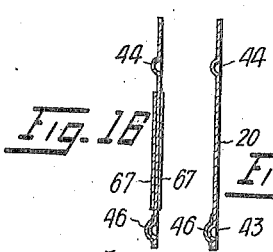
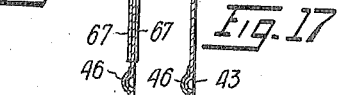
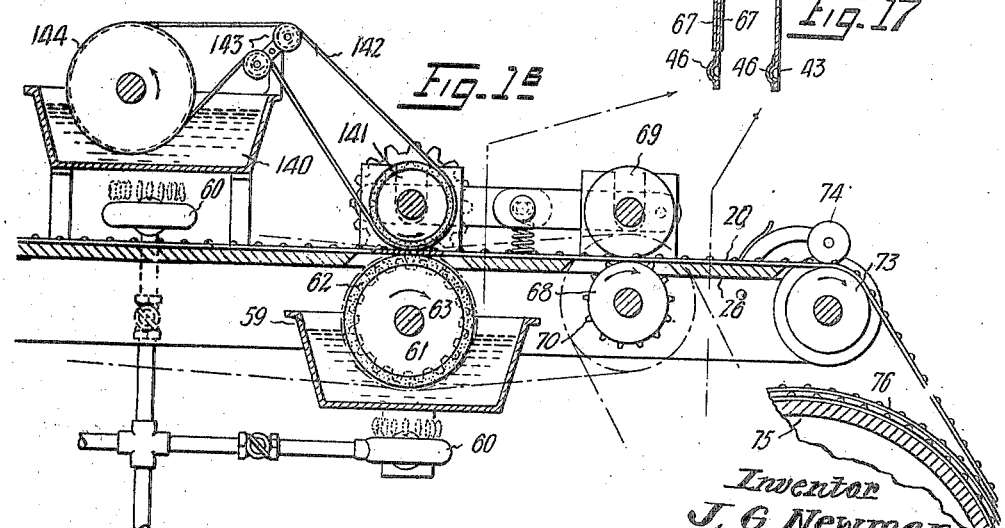
Inventor
J. G. Newman,
By Marks & Clerk
Attys.

Apr. 24, 1923.
J. G. NEWMAN
MATCH
Filed Nov. 2, 1921
1,453,229
3 Sheets-Sheet 2
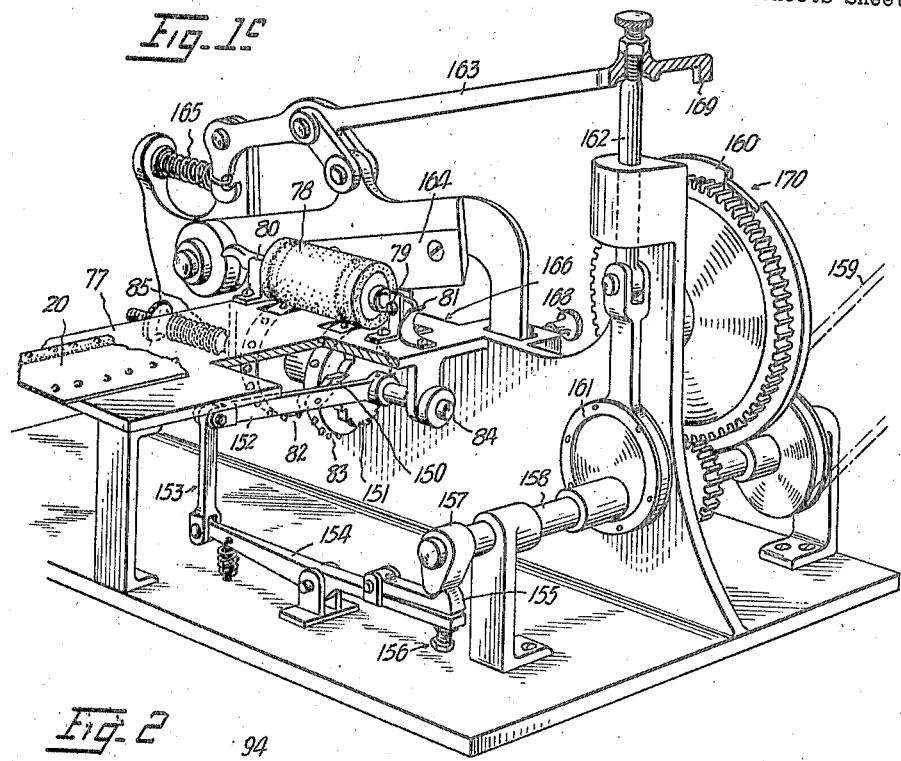
Fig. 1ᶜ
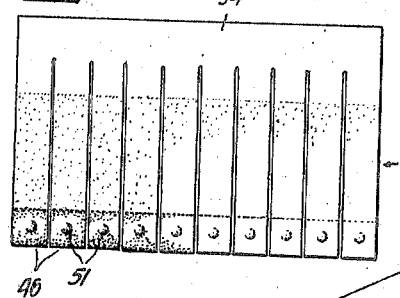
Fig. 2
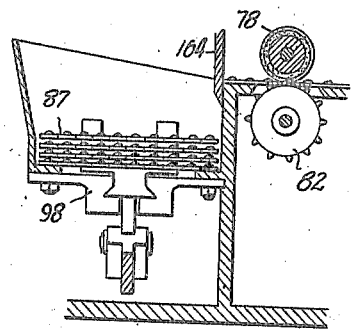
Fig. 1ᴰ
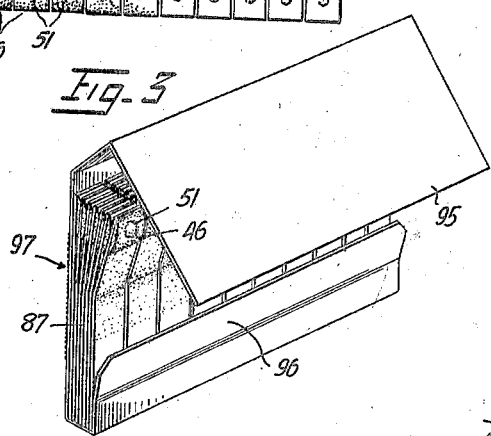
Fig. 3
Inventor
J. G. Newman
By Marks & Clerk
Attys.

Apr. 24, 1923.
J. G. NEWMAN
MATCH
Filed Nov. 2, 1921
1,453,229
3 Sheets-Sheet 3
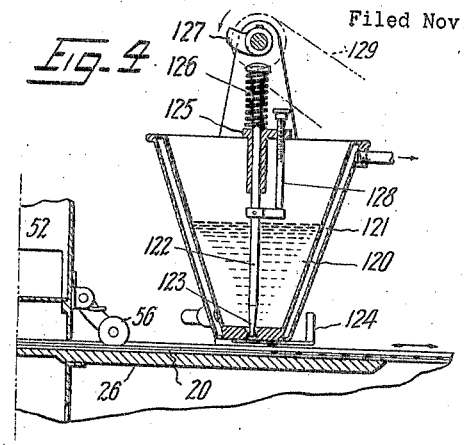
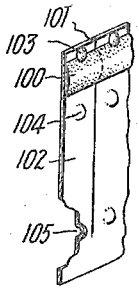
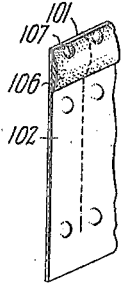
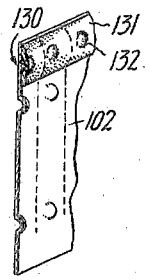
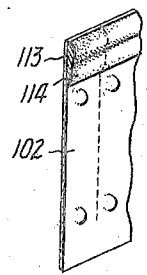
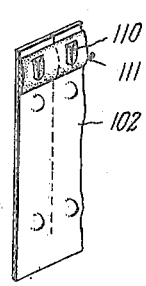
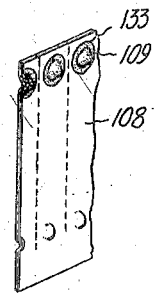
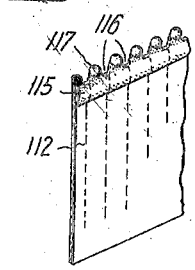
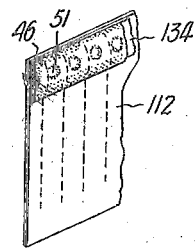
Inventor
J. G. Newman,
By Marks&Clerk
Attys.

Patented Apr. 24, 1923.

1,453,229

UNITED STATES PATENT OFFICE.

JOHN GLEN NEWMAN, OF NORTH SYDNEY, NEW SOUTH WALES, AUSTRALIA, ASSIGNOR TO JAMES HARDIE AND COMPANY LIMITED, OF SYDNEY, NEW SOUTH WALES, AUSTRALIA.

MATCH.

Application filed November 2, 1921. Serial No. 512,362.

*To all whom it may concern:*

Be it known that I, JOHN GLEN NEWMAN, subject of the King of Great Britain and Ireland, residing at 40 Jeffrey Street, Milsons Point, North Sydney, New South Wales, Australia, have invented certain new and useful Improvements in Matches, of which the following is a specification.

The present invention relates to matches which are headed with a frictionally ignitable substance and have for their stems or body portions strips of stout paper, thin slivers or veneers of wood, or like strips of other inflammable material.

According to the present invention, such match bodies are "headed" on one side only, and the heading composition is extended from edge to edge of the strip, and is "crowned" to form a striking place of limited area, and it is also preferably brought up to the top edge of the strip.

The matches are manufactured by applying the heading composition to a continuous ribbon of body material and subsequently slitting this ribbon transversely to form the individual strip matches, leaving an uncut stub to facilitate binding of "cards" of matches in a satchet from which individual matches may be detached as required.

The feature of the "crowning" of the striking surfacing of the match may be embodied in any one of a variety of ways. The "crown" may be in the form of a protuberance in the heading, obtained by upwardly embossing the body substance of the match below the "head," or by applying a spot of heading or priming substance upon the head proper, or by so applying the heading composition that it will have a ridge upon it, or by notching the top edge of the match body and "tipping" the points.

If the heading substance were applied to the match as a substantially flat surfacing only, it would not be readily ignitable by frictionally striking it on a striker rubber unless it were composed of a mixture which will flash explosively and burn out before it has set the body of the match alight. But when a striking "crown" or point is provided, a slow burning heading mixture may be used, as the relatively high heat intensity engendered by the friction of the point or crown on the striker rubber in the act of striking the match will procure ignition which thereafter will extend with appropriate slowness through the mass of the heading material and procure effective lighting of the match body. But in order to ensure effective lighting of the match body it is further highly desirable that the surfacing of heading material shall extend to the edges of the strip of body substance; ignition of paper or wood body material cannot be readily procured unless the starting flame is applied to the edge portions of it—a much larger and intenser starting flame is required to ignite paper or wood strip if the flame be applied only to its flat surface and not applied to the edges of it.

When the heading mixture is applied to a prepared strip of paper or wood veneer so as to extend from edge to edge of each match head and is "crowned," a relatively poor grade of striking mixture may be used without uncertainty as to the striking and lighting qualities of the match, and with certainty that the match will not ignite explosively when struck, or the head flash out before the stem has become effectively lighted. And as by my method of manufacture the crowned heading composition is applied as a continuous streak on an endless ribbon of stem material by means of very simple mechanical devices, and as the ribbon thereafter is transversely slit to form stems of individual matches by an entirely automatic mechanical device associated therewith, it is practicable to manufacture matches thereby with great rapidity, and at extremely low cost, and to ensure an uniform product of good quality. The invention includes mechanical means and process whereby matches of the type described may be manufactured economically but I wish it to be understood that the particular structure of the apparatus hereinafter described with reference to the accompanying drawings is not essential for the satisfactory manufacture of matches according to the invention, as other mechanical devices may be used in substitution therefor for applying a streak of heading composition to the ribbon of body material, for embossing the body material or spotting it to procure the "crowning" effect, and for drying, slitting, impregnating, greasing, and packing the matches.

The heading composition used is prepared according to any proved formula—of which many are known—for the heading of "safety" match splints, and similarly the rubber composition is made according to any proved formula for safety match rubbers. The body material of the matches is also "impregnated" with a known solution commonly used in match manufacture for procuring the ember quenching effect when the flame is extinguished, and it is also treated according to existing match making practice with paraffin wax or like greasy material for augmenting its burning quality and proofing it against injury by damp.

In the accompanying drawings explanatory of the process and of the structure of the matches, Figs. 1, 1$^A$, 1$^B$, 1$^C$, and 1$^D$, read serially and form in effect one figure showing the complete apparatus in longitudinal sectional elevation, the portion shown in Fig. 1$^C$ being however shown perspectively to facilitate explanation;

Fig. 2 is a plan view of a slitted "card" of matches ready for binding in a satchet or similarly;

Fig. 3 is a perspective view of several cards of matches bound in a satchet;

Fig. 4 is a sectional elevation through the machine for "crowning" the match heads by "spotting" them;

Figs. 5 to 12 are perspective sectional elevational views of various forms of matches within the invention; and Figs. 13 to 17 are sectional views of matches during course of manufacture, these figures being related by direction lines to the place respectively where they belong in the machine.

A stock ribbon of heavy paper or thin wood sliver 20 is wound on a stock reel 21 and said reel is fitted with usual means for braking its rotation so as to maintain the ribbon 20 under slight tension whilst being drawn off the reel. 22 is a rider roller sustained on an arm 23 supported by a spring 24 to hold the uncoiling ribbon 20 up towards the drum so as to prevent loosening of the ribbon in the uncoiling process. The ribbon passes between the carrier and jockey rollers at 25 over a table 26. Below a cavity 27 in this table a pin drum 28 is mounted on an horizontal shaft 29. This drum is driven by a belt diagrammatically indicated by the dotted line 30, said belt being in turn driven by any appropriate motive power.

The direction of rotation of the pin drum 28 is shown by the arrow thereon. Near each end of the roller, pin teeth 31 on its periphery, project above the surface level of the table 26. An embossing roller 32 is mounted above the table 26 parallel with and in vertical relation to the pin drum 28 and spur-geared thereto. On its periphery small pockets 33 are formed to register with the pin teeth 31. The axle of the roller 32 is carried in a riding yoke 34 which is held down by a spring 35, 36 being a screw for regulating the tension of the spring 35. The stock ribbon 20 in passing between the rollers 28 and 32 is embossed near each of its edges; the pin teeth 31 forcing up the material into the pockets 33 in the roller 32 so that when the ribbon 20 has passed said rollers it appears as shown in the latter part of the figure and in Fig. 13 with embossments 43—44 upwardly disposed thereon.

Shortly after passing the embossing rollers 28—32 the strip passes under the hopper 38. This hopper is provided with a steam jacket 39 having suitable steam and exhaust pipe connections thereinto, and at the foot it is provided with a throat valve 40. The valve 40 controls the area of the orifice at the foot of the hopper 38, 41 are stirrers driven by gearing 42 for maintaining the composition mixture uniform in density. The heading composition, which is a viscous fluid mixture, is charged into the hopper 38 and maintained in a warm condition by the steam jacket, and as the ribbon 20 passes under the mouth of the hopper below the valve 40, heading composition flows onto the ribbon 20 near one edge of it. This streak of heading composition is contained between two fences, one of which is a ledge on the table bed against which one edge of the ribbon runs, and the other, 49, is located at the other side of the hopper foot and sets close down on the top surface of the ribbon 20. An adjustable sweep gauge or strickler gate 50 is fitted at the front end of the hopper foot; it functions to set the thickness and to determine by its shape the cross section of the streak of heading composition which is deposited on the ribbon 20 from the hopper foot.

A section of the ribbon after it passes under the hopper 38 is shown in Fig. 14, where it will be seen a streak 46 of heading composition is applied immediately over the line of embossments 43, extending from a little below said embossments to the edge 47 of the strip 20, (this edge forming the top end of the finished match at the conclusion of the manufacture.) The next section (Fig. 15) shows the streak 46 lying flat between the embossments 43 but projecting above the flat level where it over-lies the embossments. 51 is the "crown" of the surfacing which is produced by the spreading of the surfacing composition over the embossments 43.

52 is a drying oven, the temperature of which is maintained by gas fires 53 in a jacket chamber 54 enclosing the drying chamber 55. In the course of the ribbon through the drying chamber 55 the streak of surfacing 46 upon it is dried out and set.

Upon passing out of the oven chamber 55, the ribbon 20 is held down to the table 26 by a jockey roller 56 carried by a spring loaded arm 57. The surfaced strip thence passes through the waxing machine. This machine contains two troughs 59 and 140 in which paraffin wax or other suitable greasy impregnating material is contained. 60 are gas burners set below these troughs to maintain the wax in a warm fluid condition. A roller 61 covered with felt 62 is mounted on a driven spindle 63 and runs in the molten wax in the trough 59. A roller 141 is geared to the roller 61 and is carried on floating bearings so as to bear its weight towards the roller 61. Over the roller 141 passes a continuous cloth or tape belt 142; this belt runs over guide rollers 143, and over a dipper roller 144, which like the roller 61 is mounted for free rotation to work in the molten wax in the trough 140. The belt 142 and the face of the roller 61 grip the paper strip gently but sufficiently tightly to draw it along the table when the rollers are rotated. In passing between the roller 61 and the belt 142 the paper strip is coated with a thin film of wax on both sides of it for the desired width between the two rows of embossments 43, 44, and approaching the embossments 43. The ribbon position is determined by the sprocket drive the drive applied by the roller 61 and belt 142 being a "slipping" drive. In an exaggerated section the surfaces of waxy material applied to the strip 20 are shown at 67 in Fig. 16. Beyond the trough 59, the strip 20 is drawn along the table 26 by the sprocket rollers 68, the jockey roller 69 which is carried in floating bearings serving to hold the strip 20 in working contact therewith. Two rows of sprockets 70 on the roller 68 engage the embossments 43 and 44 respectively. The headed portion of the strip 20 is not crushed or deformed at any stage in the process the jockey roller being finished to offer the necessary clearance. A regular continuous feed of the ribbon is thus maintained through the machine.

The sprocket roller 68 is timed so that through it, progressive motion at the same rate as before is applied to the ribbon 20.

Fig. 17 shows the section of the ribbon 20 as it appears after passing the rollers 68—69, and it will be observed that at this point the surfacing of waxy material 67 is not shown in the view, for the reason that the waxy material has become absorbed into the body of the paper or wood constituting the ribbon, the absorption being facilitated by the warm condition of the ribbon 20 which it preserves for some time after leaving the drying chamber 55. Finally the ribbon 20 passing between the beam roller 73 and the spring loaded jockey roller 74 above the same passes onto a stock drum 75, this drum being driven through a lightly slipping clutch which applies drive to it so that the strip 20 is held in very light tension, insufficient to cause any injury to the headed portion of it when the convolutions are wound one over the other as shown at 76. The finished stock ribbon as wound on the stock roller 75 is retained on that roller preferably for several hours for setting or ageing purposes, before slitting and packing.

From the stock drum 75 the ribbon 20 comes to the table 77. The ribbon is shown broken short in order to facilitate explanation. From the table 77 the ribbon passes under the rubber faced jockey roller 78. This roller is in floating bearings one of which is pivotally carried in its mounting at 79 whilst the other is carried in a fork guide 80, a spring 81 being provided to prevent accidental vibration of the roller in work. The bearing arrangement described has been devised in order that the roller may be tipped upward to offer access to the strip passing below it to facilitate adjustment and inspection. The faces of two sprocket rollers 82 and 83 project up through slots in the table 77, the sprocket centering and gauge being identical with the toothing on the wheels previously described. The sprocket wheels 82 and 83 are mounted through a friction clutch on a drive spindle 84, 85 being a spring for adjusting the clutch tension. Intermittent rotation is applied to the spindle 84 by a pawl 150 coacting with a detent wheel 151 fixed on it, said pawl being carried on a rock arm 152 which is connected by a link 153 to an oscillating beam 154. On its power end this beam is fitted with a cam striker 155, 156 being a screw adjustment therefor. A cam 157 on the shaft 158 coacts with the striker 155 to apply an oscillation to the beam 154 and consequently a one-tooth advance movement to the sprocket rollers 82—83 for each rotation of the shaft 158. The shaft 158 is driven, as by a belt 159, and is geared to a timing disc 160 and carries an eccentric 161 through which a plunger 162 is operated. The plunger 162 acts under an arm 163 which is link geared to a guillotine knife 164, 165 being a pull spring acting to draw said knife down to cut the strip as it passes the back edge 166 of the table 77, and 168 being an adjustable tensioning device by which the guillotine blade is caused to bear with the desired degree of pressure against the table edge to ensure clean cutting of the strip. A check 169 on the arm 163 contacts with the periphery of the timing disc 160 near the bottom of the stroke of the plunger 162 the parts being proportioned so that the guillotine knife movement is thus arrested at part stroke except when the gap 170 is in contact relation, when full stroke is permitted. In the part strokes the strip is slitted with the appropriate numbers of partings and at the full stroke the slitted lengths are cut off, in fives, sixes, sevens or other convenient units as desired, as shown in Fig. 2. The slits do not extend the whole width of the strip, but leave a selvedge 94 to form a binding stub. A pack of the cards shown in Fig. 2 may be conveniently bound in a satchet holder as shown in Fig. 3, this holder being constructed of heavy paper or light pasteboard or wood sliver with a cover fold 95 adapted to slip in below the lip edge 96 which forms a loose hold-fast for it. 97 is a surfacing of striking rubber material applied to the back of the satchet. The embossments 44 may be rolled out in the final steps of the process so as to leave the lower parts of the match stems quite flat as they are shown in Figs. 2 and 3. In the satchet the matches appear as shown in Fig. 3; they may be readily torn out from the pack and used individually. It will be noted that the embossments of the matches register with the embossments of matches set in front of them. As the waxy or greasy surfaced material permeates the body of the ribbon when absorbed into it so as to extend right up to the tip ends of the matches, it acts to waterproof the heads and thereby protect them against damp, and as the backs of the match strips are thus waxy they are lubricated to a slight extent, and therefore do not cause mechanical injury to the crownings or surfaces of the matches underlying them in the satchet (Fig. 3) and risk of accidental ignition is minimized.

The embossings 44 may correspond in centering with the crowning embossings 43 or they may be alternated therewith. They serve the double purpose of providing a gripping means for the feed mechanism and for uniforming a slight extension in length along one side and consequent curvature which the strip 20 would suffer if the embossments were applied along one edge of it only on the line 43.

In Fig. 1D is shown a receiving carrier tray 98 located beyond the end 166 of the table 77 into which the cards 87 containing 10 matches, or any other number, (as shown in Fig. 2), are delivered. The tray 98 which is moved intermittently by any suitable mechanism driven in timed relation with the guillotine 164 serves to discharge 7 cards of matches to the packers. Obviously by altering the timing relation any other desired number of "cards" 87, of matches may be delivered in bunches, thus 5, 6, 8, 10 or any other number.

The process which has been thus described is the process which we find effective in practice. It produces matches constituted of a body or stem portion consisting of a flexible strip detachable by tearing from a card (Fig. 2) conveniently packed in a receptacle such as a satchet (Fig. 3). The appearance of these matches is as shown in Figs. 2 and 3. 46 represents the streak of heading composition and 51 the crown portion thereof, the crowning being in this case effected by embossing the stock ribbon upwardly near its top end side during the course of the manufacture. It will be further observed that the streak of heading material extends completely across the top end of each match strip, but at one side of the strip only, so that when the heading material is ignited, flame will extend to the lateral edges of the match stem and to the top edge of it, and it will be thus ensured that the stem portion of the match will be effectively lighted. Furthermore, as has been already explained, the heading composition may be a low grade product because the body portion 46 of it is required only to burn without flashing, the crowned portion 51 being depended upon to start the flame, which it readily does when it is applied to the striking rubber in the usual way, because the friction acting on the crown or point 51 is sufficiently intense to initiate combustion, and combustion once initiated spreads freely in the mass of the surfacing 46, which otherwise would resist efforts to ignite it, and if ignited except through a starting point from which ignition extends gradually, the ignition would be sudden and of a flashing order, so that the heading material would in that case burn out rapidly and the match stem would not be ignited with certainty, and the match would have only low utility.

Obviously other methods of manufacturing matches embodying precisely the same principle are within the scope of the invention. Thus, for instance, the igniting streak may be applied to the ribbon so as not to extend to the top edge of same and the crowning may be effected by spotting, or the streak may be carried to the top edge of the ribbon.

In Fig. 5 is shown a fragmentary sectional view of a match ribbon in which the heading streak 100 does not extend to the top edge 101 of the ribbon 102. At intervals, spots 103 of heading composition are applied after the streak 100 is set. The ribbon 102 is fed through the apparatus during the process by sprockets engaging in embossments such as 104 and 105 which are formed in the strip during the process of manufacture in the manner already described.

In Fig. 6 is shown a similar view where the streak 106 is carried up to the top edge 101 of the ribbon 102, and the crowning spots 107 are applied upon the streak 106 after drying has taken place.

In Fig. 7 an alternative method of embossing the surfacing to "crown" it is disclosed. In this case the stock ribbon is "spotted" with any material to form nodules 130 at regular intervals. These nodules serve the same purpose as the embossments 43 shown in earlier figures. After this preliminary spotting the stock ribbon is passed through the process of manufacture already described in which heading material is spread in a surfacing streak 131 along one side of it, this material, as explained with reference to Figs. 2 and 3, forming protuberances above the nodules 130 to form the crownings 132 on which dependence is placed for ensuring initial ignition in striking. If the spotting material contains a vaporizing or burning substance having deodorant, perfuming, or other qualities, matches so made may be utilized for deodorizing, perfuming, or other such purposes.

In Fig. 8 is shown an arrangement which is not by any means desirable but which is still possible in use. In this arrangement the stem ribbon 108 is embossed in the manner before described, and heading material is applied upon one line of the embossments to form crowns 109 with rimmed portions 133 which do not spread to the side edges of the finished match. This arrangement is objectionable for the reason that whilst striking is facilitated by the crowning, ignition of the stem portion of the match is difficult because the ignited heading material does not extend to the match edges.

In Fig. 9 an arrangement is shown corresponding with the arrangement shown in Fig. 5, except that the spots 103 are in this case shown as prism shaped spots 110 applied over the streak 111 of heading material.

In Fig. 10 the spotting is omitted, but the streak of heading material is applied so as to leave the top edge portion 113 standing up above the general surface 114 of the streak. This ridge 113 forms in effect a continuous edge which is equivalent to an embossed or spotted crowning and serves the like purpose of facilitating the initiation of ignition by frictional contact of the match on the striker rubber. Matches headed in this way are usually only satisfactory in use when struck on the side edge portion; otherwise there is a risk of "flashing."

In Figs. 11 and 12, views are shown of matches made according to this invention from wood slivers. The essential feature is here again the crowning of a surfacing of heading material which is applied to one side only of the match strip. The embossment of wood slivers in the manner already described with reference to Figs. 1 to 1ᴰ is not practicable unless the edge of the ribbon of wood is first covered with a strip of paper. This is shown at 134, Fig. 11. This paper strip is applied in a preparatory stage of treatment by any convenient means, the paper being glued to the wood. It is found that when slivers carrying paper reinforcement are submitted to the embossing operation already described the embossments remain much as they do in the case of matches made of heavy paper, and a similar result is obtained, the matches produced corresponding with those illustrated in Figs. 2 and 3. In effect, this form of match is identical with the preferred form Figs. 2 and 3 except that the strips are wood backed.

Wood sliver matches may be made by the streaking and spotting methods described without requiring the application of a paper strip 134. It will, however, be almost invariably more economical to produce matches according to any of these methods utilizing heavy paper for the stem or body portion.

An alternative method of producing wood sliver matches may, however, be practised to procure a match strip 112 ready for cross slitting, as shown in Fig. 12. The engrailed edged wood ribbon is now headed with a streak 115 of heading composition in the manner before described. This composition when applied tends to spread upwards on the salient portions of the ends as shown at 116. Finally the tips are spotted as shown at 117. This spotting does not extend over the back of the match. In all cases it is desirable that the reverse side of the match should be clear of any igniting material. Otherwise there would be a risk of burning the fingers of the user in the striking operation.

The means for applying the spotting superposed upon the streak of heading material are not material, but a convenient machine for performing this operation is indicated in Fig. 4. After leaving the oven 52, the ribbon 20 passing over the table 26, goes below the hopper 120. This hopper is steam jacketed (121) and is provided with a plunger 122 adapted to reciprocate in the conical throat hole 123 in the bottom of the hopper. 124 is a cut-off plate for closing the exit hole 123. The top end of the plunger 122 is carried in a bearing 125 and is armed with a lift spring 126 to hold it up to the cam 127. 128 is a regulating check which is set to determine the range of movement of the plunger 122. The cam 127 is driven by a belt indicated at 129, and functions to apply reciprocation to the plunger 122 in timing with the feed mechanism, so that the plunger makes a reciprocation for each spotting required. As the plunger reciprocates in the hopper hole 123, it ejects a spot of the heading material and applies same to the ribbon passing below, so that the spot, according to the place of its application, appears as shown in Figs. 5 and 6. By altering the shape of the plunger point and the hole 123 the shape of the spotting is determined.

What I claim as my invention and desire to secure by Letters Patent is:—

1. A match having a stem constructed of a strip of stout paper or thin wood veneer, and having slow burning igniting composition applied on one side only of said strip with a protuberance in said composition forming an ignitable striking face of small area.

2. A match whereof the body is constituted of a strip of stout paper or wood veneer impregnated with ember quenching material and treated with wax and the "head" is constituted of a crowned surfacing of striking material applied on one side only of said strip.

3. A match having a crowned surfacing of striking material on one side only of a strip of stout paper or wood veneer which forms the match body, said surfacing extending across said strip from edge to edge thereof.

4. A match having a surfacing of striking material on one side only of a strip of inflammable material which forms the match body, said surfacing extending from edge to edge of said strip across a protuberance thereon.

5. A match having a surfacing of frictionally ignitable striking material on one side only of a strip of wood veneer which forms the match body with a paper backing underlying said surfacing, said backed strip being embossed, and said surfacing covering the embossment and extending therefrom to either edge of said strip.

6. A match consisting of a taper headed strip of wood veneer having striking material covering one side only of the head portion of the strip and extending from edge to edge of the strip and spotted on the taper tip with frictionally ignitable material.

7. A match having its body constructed of stout paper with frictional striker surfacing on one side only of said strip extending from edge to edge thereof and having a protuberance of frictionally ignitable material upon said surfacing.

8. A match consisting of a strip-like body portion having one end embossed to form a head and ignitible composition pressed on said embossed head.

9. A match including a strip-like body portion composed of a stem and a head, the head being embossed to form a protuberance on one face only, and an ignitible composition covering said embossment.

10. A match having a stem constructed of a strip of stout paper and having slow burning igniting composition applied on only one side of said strip with a protuberance in said composition forming an ignitible striking face of small area, said strip being embossed to form said protuberance.

11. A match formed from a strip of inflammable material including a stem and a head having an embossment on one face, a surfacing of striking material on one side only of the strip, said surfacing material covering said embossment and extending from edge to edge of said strip and tipped with a spot of frictionally ignitible material.

In testimony whereof I affix my signature.

JOHN GLEN NEWMAN.